May 27, 1941.　　　P. R. ARONSON ET AL　　　2,243,184
METHOD OF MAKING BLOWPIPE NOZZLES
Filed Aug. 19, 1937　　　2 Sheets-Sheet 1

INVENTORS
PETER R ARONSON
WILLIAM E SELF
BY
ATTORNEY

Patented May 27, 1941

2,243,184

UNITED STATES PATENT OFFICE 2,243,184

METHOD OF MAKING BLOWPIPE NOZZLES

Peter R. Aronson, Millburn, and William E. Self, South Orange, N. J., assignors to Oxweld Acetylene Company, a corporation of West Virginia Application August 19, 1937, Serial No. 159,826

18 Claims. (Cl. 29—157)

This invention relates to the art of oxy-acetylene blowpipes, and particularly to a new and improved method of making blowpipe nozzles.

Heretofore, blowpipe nozzles have been swaged from blanks of copper bar-stock provided with longitudinally drilled rough oversize passages including a central oxygen passage and a series of preheat passages in which mandrels in the form of music wire are inserted. By virtue of the swaging operation, the length of the metal blank is increased, and its cross-sectional area as well as that of the rough oversize passages is reduced, the latter conforming with the cross-section of the wire mandrels.

In these prior known methods, a metal blank is drilled from one end and although these drills are started accurately, they are, nevertheless, subject to movement known as "walking" during the drilling operation, so that although the plurality of holes entering the blank are symmetrically located with respect to each other, their points of exit are invariably anything but symmetrical. If the passages surrounding the central oxygen passage are not accurately and symmetrically located, a preheat flame of inferior quality will result. In some instances, this will affect the rate of preheat as much as five percent. Likewise, the passages at the rear end of the nozzle must be accurately located, otherwise they will interfere with the formation of a gas-tight seat about the same, and about the central passage thereof.

Methods of drilling these metal blanks have been proposed which overcome the above difficulties; one such method being disclosed in U. S. patent application Serial No. 159,659, filed August 18, 1937, by P. R. Aronson. In any instance, however, it is exceedingly difficult and costly to accurately drill a large number of passages in a metal blank so as to form accurate hole circles at the respective ends of the blank, and to maintain the ratio between the passage diameters and the wall thicknesses dividing the passages of such a proportion that no folding of the metal between the same will occur during the metal working operation.

Blowpipe nozzles formed in accordance with prior known methods often contain structural defects, and the manner in which the swaging operations are performed makes it difficult to remove the mandrels from the blanks after swaging. Often, the application of intense heat to the blank and extreme tensile stress to the mandrels is required to effect their removal. Many of the difficulties and defects are due to the metallurgical changes occurring in the metal blank during the swaging operation. If the cold-working of the blank is too severe, the grain structure of the metal becomes extremely fine and thus its ductility decreases. Likewise, the hardness of the metal increases to such an extent that continued cold-working causes it to pulverize, whereupon the walls between the passages may tear, and little if any additional flow occurs along the mandrels and the swaging dies.

Another disadvantage attending the use of severe swaging steps in these prior known methods is that the mandrels are seldom serviceable for more than ten swaging operations. This is probably due to the fact that the excessive cold-working of the blank hardens the metal to such an extent that continued cold-working causes it to rigidly grip the mandrels. Then, as this hardened metal is forced along the mandrels, intensive tensile stresses are set up therein as well as an excessive concentrated frictional heat which latter draws the temper of the mandrels, and both of which cause their premature failure.

An object of this invention is to provide a new and improved method of making blowpipe nozzles in which no drilling is required, and in which the above and other difficulties will be avoided. Other objects of the invention include: the provision of a method of uniting multiple parts to form a unitary and substantially homogeneous blowpipe nozzle; the provision of a method of swaging multi-piece blowpipe nozzles in which the swaging operations are such that the mandrels are not materially affected and may be readily removed from the swaged multi-piece blanks without resorting to heat and excessive tensile stress to separate the same; the provision of a method of swaging a multi-piece blowpipe nozzle in which the assembled parts are gradually elongated and gradually reduced in cross-section by employing a relatively large number of separate and successive swaging steps; and the provision of a method of swaging blowpipe nozzles of the multi-piece type in which a definite sequence of steps is maintained including the step of annealing the assembled parts after certain swaging steps.

The above and other objects of the invention will become apparent from the following description and the accompanying drawings, in which.

Figure 1:
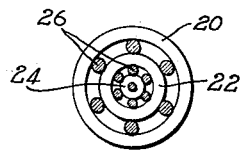
Fig. 1 is an end view of an assembly of parts adapted to be subjected to a metal working operation for producing a blowpipe nozzle in accordance with the invention.

Figs. 5 to 8, inclusive, are views similar to those of Figs. 1 to 4, inclusive, and disclose a modified form of an assembly of parts and nozzle produced in accordance with the principles of this invention;

Figs. 9 to 12, inclusive, are views similar to those disclosed in Figs. 1 to 4, inclusive, and show another modified form of an assembly of parts and nozzle produced in accordance with the principles of this invention; and Figs. 13 to 18, inclusive, are views showing two elements and their relation to each other at different stages in the process of making another type of blowpipe nozzle in accordance with the principles of this invention.

Referring to Figs. 1 to 4, inclusive, three equal lengths of copper tubing 20, 22, and 24 are cut from copper tube-stock. The respective diameters of the tubular members are such that they may be concentrically assembled with annular spaces between the same. These tubular members preferably possess a ductility or softness which will give a reading below zero on the "B" scale of a "Rockwell" hardness tester when a weight of one hundred kilograms is employed with a one-sixteenth inch penetrating ball. Such a degree of hardness has been found sufficient to permit the first swaging step or steps without adversely affecting the product, or impairing the process. In the event the tubular members are of a greater hardness than that specified, they are individually annealed; pickled in a commercial solution of sulphuric acid in order to remove the copper oxide that forms thereon during the annealing operation; and finally, they are bright-dipped in a solution of nitric acid and washed in hot water so that their surfaces will be rendered absolutely free from all impurities that may detrimentally affect the subsequent swaging operations. This procedure properly conditions the tubular members 20, 22, and 24 for the first swaging steps.

Having the members in proper condition for swaging, they are assembled in concentric relation and mounted on the first mandrel assembly which comprises a series of piano wires 26. The diameters of the wires 26 are substantially greater than the ultimate diameters of the finished passages to be formed between the members 20, 22, and 24, but small enough so that they freely pass within the annular spaces between the same. The mandrel assemblies are essentially the same as those disclosed in U. S. patent application Serial No. 248,725, filed December 31, 1938, by P. R. Aronson, now Patent No. 2,186,088 of Jan. 9, 1940. The wire mandrels are oiled and they may be fed into the annular spaces between the respective tubes from either the flame end, or the entrance end of the assembly of tubular members. Since the metal of the assembly has a tendency to distort at the end which fed into the swaging dies, and this distortion is less objectionable at the entrance or seat end of the nozzle than at the flame end, it is desirable in many instances to feed the mandrel wires into the assembly from the flame end. This procedure may be followed except where it is desired to nose the flame end of the nozzle, where it would be impracticable.

In order to insure the accurate disposition of the mandrel wires within the annular passages between the tubes 20, 22, and 24 during the swaging operations, spacers 28 are employed. These spacers are in the form of discs perforated with accurately arranged holes just large enough to slidingly receive the mandrel wires. The external diameters of these discs are slightly less than the external diameters of the respective ends of the assembly of tubular members after the same has been subjected to any one swaging operation. In other words, a series of spacer discs 28 of varying external diameters and hole arrangement are employed throughout the various swaging steps. Each new swaging step employing a smaller swaging die than that previously used, requires the use of a smaller spacer disc 28, so that interference between the discs 28 and swaging dies will not occur.

The outer surface of the member 20 is preferably powdered with mica and the assembly is then fed into a rotary swaging machine, the die surfaces of which are in such relative angular relation (11 degrees or less) and of such cross-sectional shape that they automatically draw the assembly therebetween. The swaging operation elongates and frictionally unites the assembly of tubular members, and forms therefrom a composite, substantially unitary blank of reduced cross-sectional area. It also causes the metal to flow into the annular spaces between the respective tubular members, except where the wire mandrels are positioned. Thus it is seen that oversize passages conforming to the diameter of the first mandrel wires are formed within a substantially homogeneous blank made up from the three concentrically arranged members 20, 22, and 24. The composite blank and mandrel assembly is moved in and out of each set of swaging dies a considerable number of times in order to thoroughly hammer the blank. This procedure tends to loosen the mandrels within the passages formed between the respective tubular members and makes it possible to withdraw the mandrels from the composite blank without subjecting the blank to excessive heat, or applying extreme tensile stress to the mandrels.

The amount of cold-working to which the assembly of tubular members may be subjected without failure of the metal or gripping of the mandrels is dependent upon the hardness imparted to the metal by such cold-working. Preferably, the hardness produced by any particular swaging operation or series of operations should not exceed a reading of about 35 to 40 on the "B" scale of a "Rockwell" hardness tester when a weight of one hundred kilograms is employed with a one-sixteenth inch penetrating ball. Although the swaging increases the length of the assembly, the reduction in the cross-sectional area of the composite blank is of primary importance in order to avoid gripping of the mandrels and failure of the blank. Generally, it is possible to control the rate of increased hardness and keep it within the above limits by restricting the reduction in cross-sectional area of the composite blank during each swaging operation or operations to approximately twenty-five percent of the previous cross-sectional area.

It will be understood, however, that variations in the original diameter of the assembly of members 20, 22, and 24 and the number of mandrels disposed within the annular spaces between the same will to a certain extent govern the rate at which the cross-sectional area can be reduced and still retain the hardness of the metal within the permissible limits. With a large number of mandrels disposed within the annular spaces between the respective members, less wall metal will be forced between the respective mandrels 26 and the degree of reduction of the cross-sectional area for any particular swaging step should be less since the relatively thin wall metal will fail if the swaging is too severe. In some instances, for example, the reduction may be as low as ten per cent of the previous cross-sectional area, and exceeding this rate will cause defects to appear in the nozzle, and gripping of the mandrels. However, in any case, the permissible degree of area reduction can be readily determined by trial for any batch of copper, the desired size of composite blank, and finished construction of the nozzle.

Having determined in this manner the degree of reduction which is possible for the particular design of nozzle and grade of copper employed, the least number of swaging steps and changes of mandrel wires will be automatically fixed. Thus, after the first swaging step has been carried out as described above, the composite blank may be removed from the first mandrel assembly, washed, annealed, pickled, and bright-dipped before mounting it upon the wires of the second mandrel assembly. The wires of the second mandrel assembly may be of such diameter that a further reduction of the diameters of the passages formed between the respective tubular members may be effected by a subsequent swaging operation. This procedure of inserting mandrels, swaging and extracting mandrels, is now repeated, using each time a smaller size mandrel wire and a smaller size swaging die. Thus a considerable number of comparatively slight reductions in metal will take place during the swaging, and the resulting swaged blanks will not be distorted as might otherwise be the case. The wire mandrels used in the finishing swages are of the same diameter as the desired holes in the finished nozzle.

During the swaging operation the temperature of the blank may rise to approximately 200° to 300° F. due to the working of the metal. Removal of the composite blanks from any mandrel assembly should take place while it still retains this swaging heat, because it facilitates removal of the mandrels without imparting additional heat to the wires which would otherwise occur due to excessive friction between the same and the walls of the formed passages. This procedure greatly extends the life of the mandrels, since it, together with the thorough hammering of the composite blanks, facilitates their removal without subjecting the mandrels to excessive tensile stress and frictional heat which latter would cause drawing of the mandrel temper.

It will be apparent that the character of the metal and the permissible degree of reduction may be such that in certain instances, the assembly may be given more than one swaging operation while employing the same mandrels, thus further elongating the blank and reducing its external diameter without further reducing or additionally forming the passages within the same. Also, certain of the swaging steps are often carried out on only a portion of the blank, such as the tip or flame end thereof. However, no matter what the details of the particular swaging step or steps are before the mandrel assembly is changed and the blank annealed, the hardness of the metal is preferably maintained within the limits set forth above so that neither failure of the blank nor excessive gripping of the mandrels will occur.

With the limits of reduction and/or hardness determined, the blank may be subjected to as many swaging steps as are necessary to produce a nozzle of predetermined shape and passage arrangement, and the mandrels may at all times be easily removed without the application of extreme heat or excessive tensile stress. It will be understood that between each successive reduction of bore or passage diameter, or before mounting the blanks upon a mandrel assembly, the diameters of the wires of which are less than those previously employed, the blank is properly washed in order to remove any oil or grease that may collect thereon during swaging. Whenever necessary, which is usually prior to each change of mandrels, the blank may be annealed or otherwise treated to increase the grain growth and restore the ductility to a point where it will effect a reading of below zero on the "Rockwell" tester. Pickling and bright-dipping are also utilized after each annealing step, as previously explained.

Figure 3:
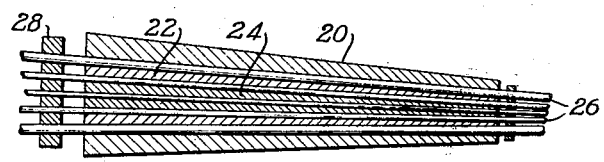
Fig. 3 is a sectional elevational view of the assembly of parts shown in Figs. 1 and 2 after the same has been subjected to a series of swaging operations and showing the distribution of the mandrels and the various sized spacers adapted to maintain the wires in fixed position without interfering with the swaging dies.
Figure 4:
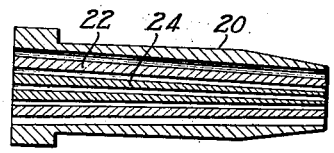
Fig. 4 is a sectional elevational view of a finished nozzle formed in accordance with the present method.
Figure 5:
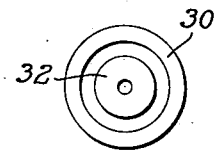
Figure 6:
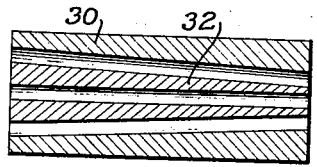
Figure 7:
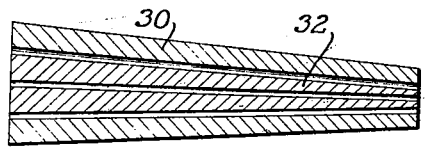
Figure 8:
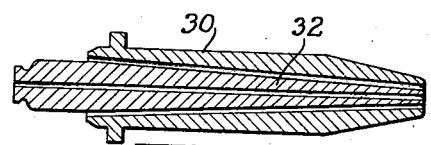

The swaged blank shown in Fig. 3 is then removed from the last mandrel assembly after the final swaging step has been performed. It is then machined to any conventional nozzle form as shown in Fig. 4, having surfaces adapted to provide fluid-tight seals with the cooperating surfaces of a blowpipe head to which the finished nozzles may be coupled, all burrs and chips removed from the passages, washed again, annealed, pickled, bright-dipped and finally inspected and ready for use.

Referring specifically to Figs. 5 to 8, inclusive, a modified assembly of parts and form of blowpipe nozzle is shown. The outer shell 30 is cut from relatively thick walled copper tubing and its internal surface is tapered. The internal member 32 is cut from similar tubing of substantially less diameter, and its external surface is provided with a taper corresponding to the internal taper of the member 30. The elements 30 and 32 are assembled and the difference in their diameters provides an annular longitudinally-extending tapered passage within which the mandrel wires are positioned, and held in accurate position by spacer members similar to the spacer members 28 used in connection with the assembly of Fig. 2. The assembled parts are then subjected to a series of swaging operations in the same manner as the assembly shown in Fig. 2, resulting in the swaged composite blank shown in Fig. 7. This blank is then machined to form the nozzle shown in Fig. 8.

Figure 9:
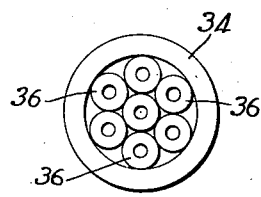
Figure 10:
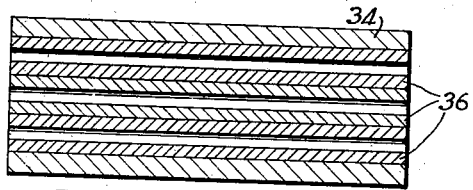
Figure 11:
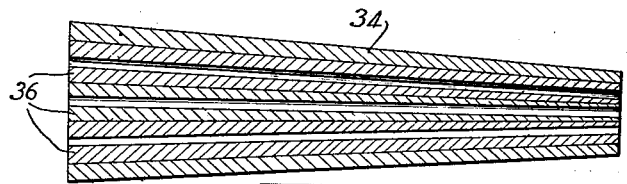
Figure 12:
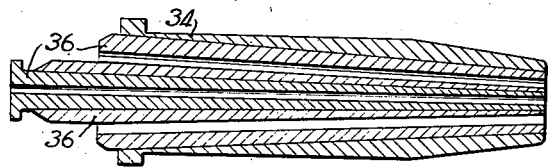
Figure 13:
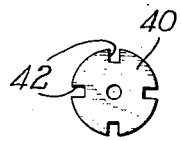
Figure 14:
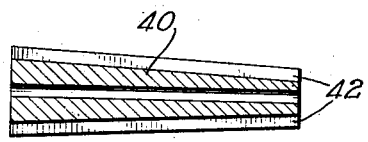

Another modified assembly of parts and form of blowpipe nozzle made in accordance with the principles of this invention is shown in Figs. 9 to 12, inclusive. The external member 34 is substantially identical with the tubular member 20, and it is adapted to receive a plurality of relatively small tubes 36, the internal passages of which are substantially larger than the ultimate size of the passages desired to be formed within the nozzle. The assembly of the parts 34 and 36 shown in Fig. 9 is adapted to receive the mandrel wires within the passages of the tubes 36, and this assembly is adapted to be subjected to the same swaging steps and procedure employed in connection with the nozzles of Figs. 4 and 8. During the successive separate swaging steps, the metal of the members 34 and 36 is cold-worked, and the resulting structure comprises a substantially homogeneous construction provided with the desired number of preheat passages surrounding a central oxygen passage. The swaged composite blank shown in Fig. 11 is then machined to form the blowpipe nozzle disclosed in Fig. 12.

Figure 15:
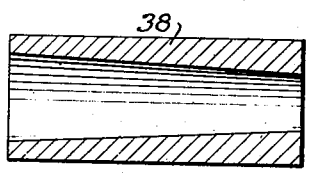
Figure 16:
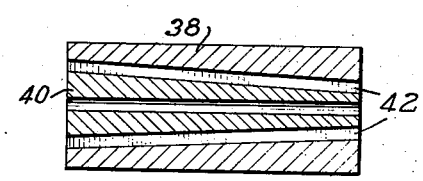
Figure 17:
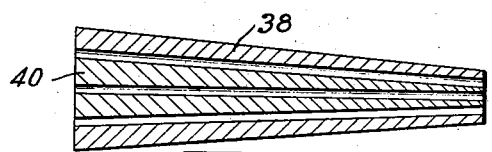
Figure 18:
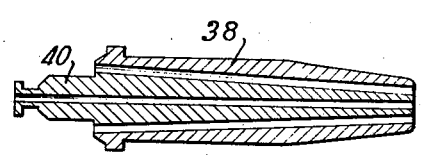

A still further modified form of the invention is disclosed in Figs. 13 to 18, inclusive. The external member 38 disclosed in Fig. 15 is substantially identical with the internally tapered member 30 disclosed in Fig. 6. The member 38 is adapted to receive telescopically an internal slug 40 formed from relatively thick walled copper tubing and provided with an external taper corresponding to, and adapted to form a press fit with the internal taper of the member 38. The internal slug 40 is also provided with circumferentially-spaced longitudinally-extending slots 42. The two members 38 and 40 are adapted to be assembled as disclosed in Fig. 16, and the mandrel wires are adapted to be inserted within the passages formed by the slots 42 and within the central longitudinal passage of the member 40. This assembly is then swaged in accordance with the method previously disclosed in connection with Figs. 1 to 4, inclusive, resulting in the swaged composite blank shown in Fig. 17. This composite nozzle blank is then machined to form the completed nozzle as disclosed in Fig. 18.

Figure 2:
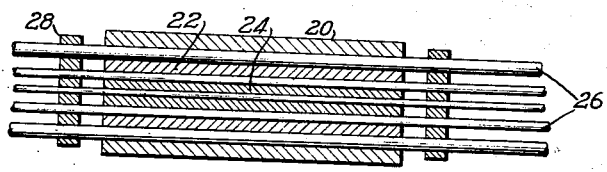
Fig. 2 is a sectional elevational view of the assembly of Fig. 1 showing the distribution of wire mandrels between the parts, and spacers for maintaining the wires in accurate position.

All forms of the invention including the various elements and the assemblies formed therefrom are subjected to the same conditions of annealing and swaging as described in connection with the assembly disclosed in Fig. 2, which treatment is substantially identical with that disclosed in U. S. patent application Serial No. 158,703, filed August 12, 1937, by P. R. Aronson, now Patent No. 2,217,193 of October 8, 1940.

It will be apparent from the foregoing description that the successive swaging operations have a three-fold function, viz., (1) all members of the multi-piece nozzle-blank assembly are simultaneously gradually reduced in cross-section and elongated; (2) all passages within the assembly are shaped and reduced to the desired size; and (3) the two or more members of the multi-piece assembly are frictionally united to form a composite substantially unitary nozzle body.

Although the various features of the improved blowpipe nozzle and the method of making the same have been described in detail to fully disclose several embodiments of this invention, it will be apparent that a number of changes may be made in such details, and certain features may be used without others, without departing from the principles of the invention.

What is claimed is:

1. A method of making blowpipe nozzles and the like which comprises positioning a plurality of tubular members of ductile metal relative to each other so as to form an assembly having one or more oversize passages extending therethrough; inserting at least one mandrel in each of said passages; and gradually elongating and reducing the cross-section of said members and said passages by subjecting the assembly to a series of separate and successive swaging operations, with such mandrels in such passages, using successively smaller mandrels in said passages during certain of said separate swaging operations, thereby forming a unitary substantially homogeneous nozzle; and annealing the swaged assembly between certain of said swaging operations.

2. A method of making blowpipe nozzles and the like as claimed in claim 1, in which said swaged assembly is annealed prior to each change to successively smaller mandrels.

3. A method of making blowpipe nozzles and the like as claimed in claim 1, in which the average percentage of reduction of cross-sectional area of the members effected by each swaging operation is about 20 percent.

4. A method of making blowpipe nozzles and the like as claimed in claim 1, in which the hardness of the metal immediately after any of the swaging operations before the swaged assembly is annealed, is not greater than about 40 Rockwell B.

5. A method of making blowpipe nozzles and the like which comprises forming a composite blank of more than one tubular member of ductile metal, said members being of such construction that they form upon assembly a plurality of oversize passages extending through said blank; inserting mandrels within said passages and, while maintaining the mandrels in accurate selected spaced relation, subjecting said composite blank to successive separate swaging operations, using successively smaller mandrels in said passages during successive swaging operations, thereby frictionally uniting said members to form a substantially unitary nozzle body having passage outlets accurately located in selected relation to each other.

6. A method of making blowpipe nozzles and the like as claimed in claim 5, in which said mandrels are withdrawn from said blank between swaging operations while the blank still retains the heat incident to the cold-working of the metal during the swaging operations.

7. A method of making blowpipe nozzles and the like which comprises assembling a plurality of concentric sleeves providing annular passages therebetween; inserting a plurality of mandrels within said annular passages; holding said mandrels in fixed accurate relation; and subjecting said assembly to a metal working operation.

8. A method of making blowpipe nozzles and the like as claimed in claim 7, in which said metal working operation consists in a series of separate and successive swaging operations.

9. A method of making a blowpipe nozzle which comprises positioning a plurality of ductile metal parts relative to each other so as to form an assembly having a plurality of longitudinal oversize passages therein; gradually elongating and reducing the cross-section of such assembly and said passages by subjecting said assembly to a series of separate and successive swaging operations while each of said passages contains a mandrel; successively substituting sets of mandrels of smaller diameter after certain of said separate swaging operations; annealing said metal parts prior to each substitution of a set of smaller mandrels; and so correlating the successive swaging operations that the average reduction of cross-sectional area effected by each swaging operation is about 20 percent and the hardness effected by any of the swaging operations before the blank is annealed is not greater than about 35 to 40 Rockwell "B."

10. A method of making a blowpipe nozzle which comprises assembling a plurality of separately formed and substantially tubular members of ductile metal in such relation to each other as to form a single assembly having one or more oversize gas passages extending therethrough; inserting a mandrel in each of such passages; swaging said assembly with such mandrels in said passages, to simultaneously gradually reduce the cross-section of said members and elongate them, to reduce the size of said passages, and also to frictionally unite said members to form a composite substantially unitary nozzle body; removing the mandrels from said passages; and machining said nozzle body adjacent one end thereof to form surfaces thereon adapted to provide fluid-tight seals with the cooperating surfaces of a blowpipe head to which the finished nozzle may be coupled.

11. A method of making a blowpipe nozzle which comprises assembling concentrically a plurality of separately formed and substantially tubular members of ductile metal in such relation to each other as to provide an oversize annular passage between each tubular member and the immediately adjacent tubular member concentric therewith, inserting a plurality of laterally spaced mandrels within each of the respective annular passages, and within a passage extending through the innermost of said concentric members; swaging said assembly with the mandrels disposed in said passages, to simultaneously gradually reduce the cross-section of said members and elongate them, to reduce the size of such passages, and also to frictionally unite said members to form a composite substantially unitary nozzle body; removing the mandrels from said passages; and machining said nozzle body adjacent one end thereof to form surfaces thereon adapted to provide fluid-tight seals with the cooperating surfaces of a blowpipe head to which the finished nozzle may be coupled.

12. A method of making a blowpipe nozzle which comprises assembling an outer substantially tubular member of ductile metal having an oversize tapered longitudinal passage therethrough, and an inner tubular member of ductile metal having a tapered outer surface and a longitudinal passage therethrough, spacing said outer and inner members from each other by a plurality of spaced mandrels to form a single assembly having one or more oversize passages extending therethrough; inserting a mandrel within the passage in said inner member; swaging said assembly with a mandrel in each of the respective passages, to simultaneously gradually reduce the cross-section of said members and elongate them, to reduce the size of said passages, and also to frictionally unite said members to form a composite substantially unitary nozzle body; removing the mandrels from said passages; and machining said nozzle body adjacent one end thereof to form surfaces thereon adapted to provide fluid-tight seals with the cooperating surfaces of a blowpipe head to which the finished nozzle may be coupled.

13. A method of making a blowpipe nozzle which comprises assembling within an outer substantially tubular member of ductile metal a plurality of laterally disposed parallel substantially tubular members of ductile metal, each of said parallel members having portions of its side walls contacting with the side walls of at least one other of said parallel members, each of said parallel members having an oversize passage therethrough, thereby forming a single assembly; inserting a mandrel in the passage within each of said parallel tubular members; swaging said assembly with the mandrels in said passages, to simultaneously gradually reduce the cross-section of said members and elongate them, to reduce the size of such passages, and also to frictionally unite said members to form a composite substantially unitary nozzle body; removing the mandrels from said passages; and machining said nozzle body adjacent one end thereof to form surfaces thereon adapted to provide fluid-tight seals with the cooperating surfaces of a blowpipe head to which the finished nozzle may be coupled.

14. A method of making a blowpipe nozzle which comprises telescopically assembling an inner member of ductile metal within an outer substantially tubular member of ductile metal, one of said members having circumferentially spaced and longitudinally extending slots cooperating with a surface of the other member to provide oversize passages extending through such assembly; inserting a mandrel in each of said passages; swaging said assembly with mandrels in said passages, to simultaneously reduce the cross-section of said members and elongate them, to shape and reduce the size of said passages, and to frictionally unite said members to form a composite substantially unitary nozzle body; removing the mandrels from said passages; and machining said nozzle body adjacent one end thereof to form surfaces thereon adapted to provide fluid-tight seals with the cooperating surfaces of a blowpipe head to which the finished nozzle may be coupled.

15. A method of making blowpipe nozzles and the like which comprises forming a tapered member from heavy malleable tubing having a central passage and having spaced longitudinally extending slots in its periphery; inserting said member within an internally tapered sleeve; inserting mandrels within the passages formed by said slots and sleeve and within the central passage of said member; and subjecting the resultant assembly to a series of separate and successive swaging operations to elongate said assembly and simultaneously reduce the cross-sections of the assembly and of said passages and frictionally to unite said member and sleeve to form a unitary nozzle body.

16. A method of making blowpipe nozzles and the like which comprises assembling a plurality of concentric sleeves of ductile metal to provide annular passages therebetween; inserting at least one mandrel within each of said annular passages; and subjecting said assembly to a metal working operation so as to frictionally unite said sleeves and to form a substantially unitary nozzle having gas passages extending therethrough.

17. A method of making blowpipe nozzles and the like which comprises assembling within an annular sleeve a plurality of thin-walled tubes of ductile metal each having an oversize passage extending therethrough; inserting at least one mandrel within each tube; and subjecting such assembly to a metal working operation so as to form a substantially unitary nozzle having a plurality of gas passages extending therethrough.

18. A method of making blowpipe nozzles and the like which comprises forming a composite blank of more than one member of ductile metal, such members being of such construction that they form upon assembly at least one oversize passage within the blank; inserting a plurality of mandrels in accurately spaced relation within said passage; and subjecting the blank to successive separate swaging operations; and maintaining said mandrels in such accurate spaced relation during each of said swaging operations by employing a succession of spacer means on said mandrels of smaller diameter than the composite blank at every stage of said swaging operations.

PETER R. ARONSON.
WILLIAM E. SELF.